B. F. AUGUSTINE.
FLEXIBLE SHAFT COUPLING.
APPLICATION FILED FEB. 15, 1911.
1,010,717.
Patented Dec. 5, 1911.
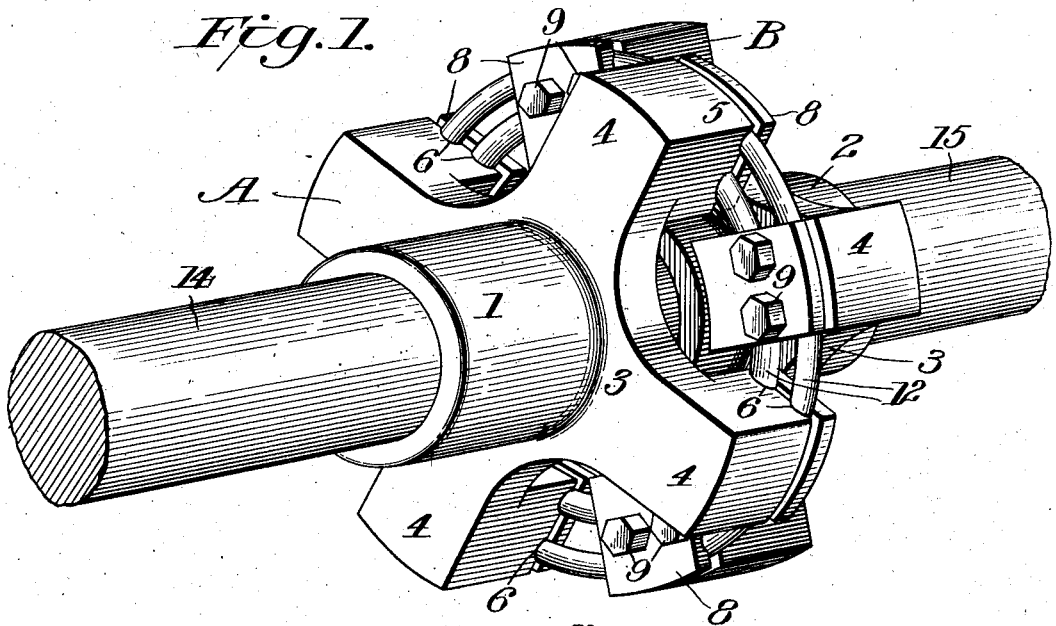
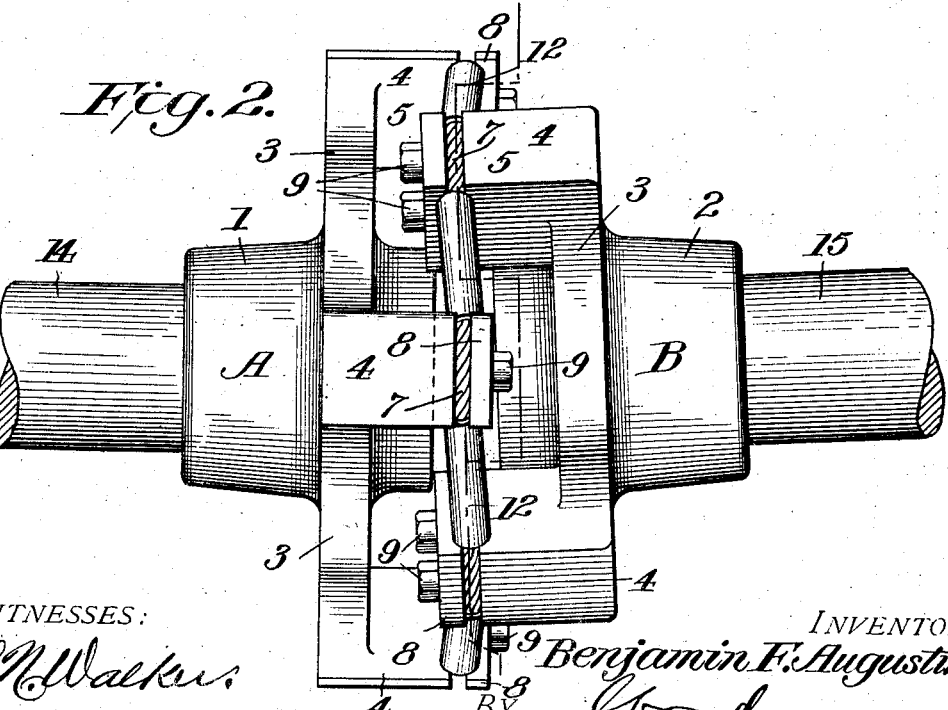
WITNESSES:
CN Walker
J. T. Walker
INVENTOR
Benjamin F. Augustine
BY
Attorney B. F. AUGUSTINE.
FLEXIBLE SHAFT COUPLING.
APPLICATION FILED FEB. 15, 1911.
1,010,717.
Patented Dec. 5, 1911.
2 SHEETS—SHEET 2.
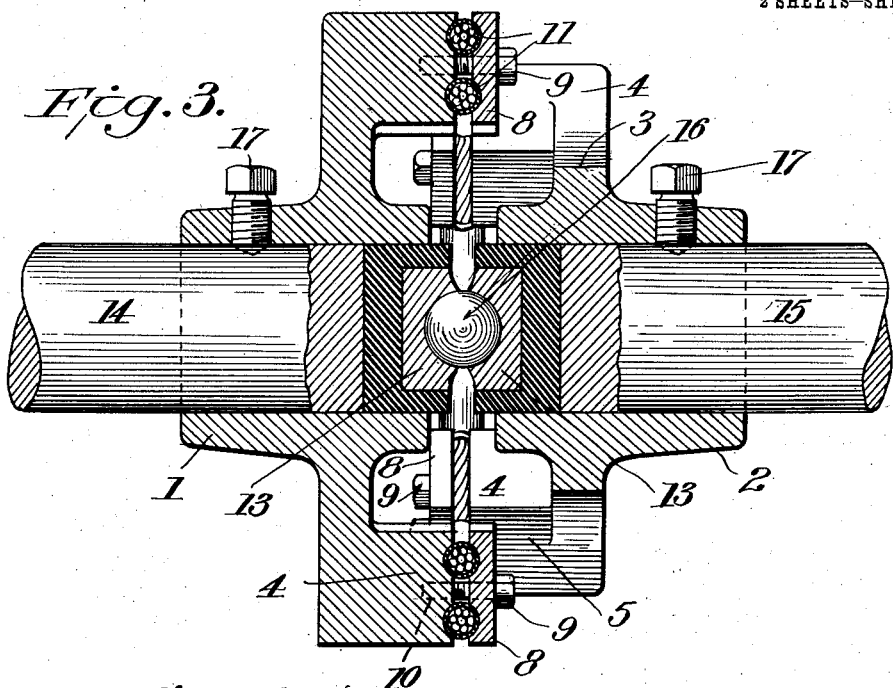
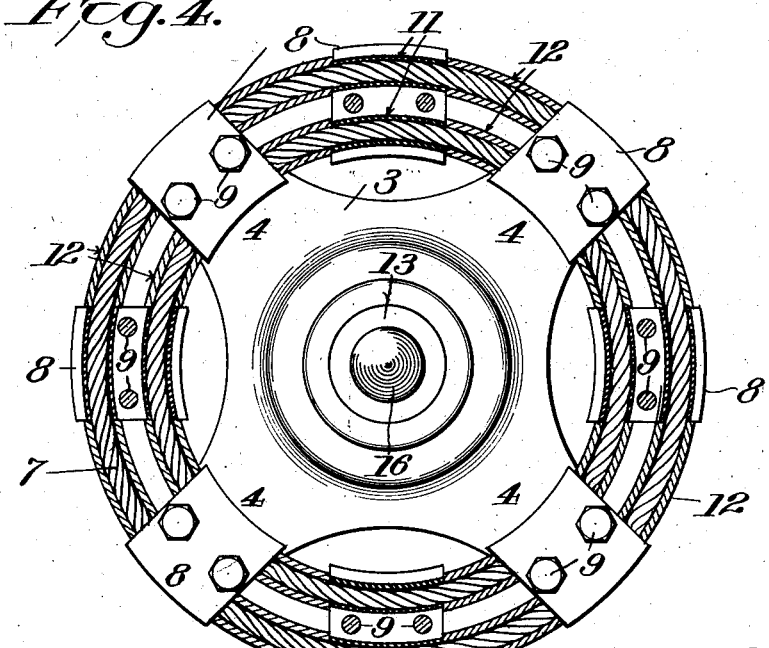
WITNESSES:
C. H. Walker.
J. T. Walker.
INVENTOR
Benjamin F. Augustine
BY
Attorney ns of Letters Patent.

UNITED STATES PATENT OFFICE.

BENJAMIN F. AUGUSTINE, OF BUFFALO, NEW YORK.

FLEXIBLE SHAFT-COUPLING.

1,010,717.   Specification of Letters Patent.   Patented Dec. 5, 1911.

Application filed February 15, 1911. Serial No. 608,703.

*To all whom it may concern:*

Be it known that I, BENJAMIN F. AUGUSTINE, a citizen of the United States, residing at Buffalo, in the county of Erie and State of New York, have invented certain new and useful Improvements in Flexible Shaft-Couplings, of which the following is a specification.

This invention relates to flexible shaft couplings.

One object is to provide a flexible coupling for rotary or other shafts embodying among other characteristics a universal joint connection between the coupling members.

Another object resides in the provision of a flexible shaft coupling embodying companion members provided with radial fingers of one member arranged between the fingers of the other member so that one member may be tilted with respect to the other without hindrance by the fingers.

A still further object is to provide a coupling for shafting and the like embodying coupling members which have radial fingers which are yieldably connected by flexible elements, on which are loosely mounted sleeves or other form of combined spacing and driving connections adapted to maintain the fingers in spaced relation particularly in the event of loosening of the flexible connecting elements.

With the above and other objects in view the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any advantages of the invention.

In the accompanying drawings:—Figure 1 is a perspective view of the invention. Fig. 2 is a side elevation illustrating the coupling supporting shafts out of alinement. Fig. 3 is a longitudinal sectional view. Fig. 4 is a cross sectional view on the line *a—a* of Fig. 2.

Now referring more particularly to the accompanying drawings, the reference characters A and B indicate coupling members, each including a hub 1, 2 provided with a radial flange 3 formed to provide equidistant, radial fingers 4 which are increased in thickness or otherwise enlarged at their outer ends, as at 5, with the enlargements directed toward the companion member and having their inner faces provided with one or more grooves 6. The fingers of one coupling member are preferably disposed between the fingers of the companion coupling members, there being flexible metallic or other yieldable elements 7 connecting the fingers of both members and disposed in the grooves of the thickened portions of the fingers and clamped therein through the instrumentality of suitable clamping plates 8, which latter have their inner faces grooved to coincide with the grooves 6 of the fingers. These plates 8 may be clamped to the fingers in any suitable manner, preferably by the studs 9 which have screw-threaded engagement in the screw-threaded sockets 10 of the thickened portions of the fingers.

If desired, insulating material 11 may be disposed on the flexible elements 7 between the fingers and the clamping plates and I preferably mount loosely on the flexible elements 7 between the fingers of one coupling member and the fingers of the companion coupling member, the metallic or other driving connections 12. These driving connections insure positive driving of the coupling members with the fingers of one member in spaced relation to the fingers of the other member, and in the event that the flexible elements 7 should slip in their grooves these driving connections would maintain the proper spaced relation of the fingers and insure positive driving of the members.

Mounted in each hub at the inner end thereof is a cup 13, preferably embedded in insulating material, against the outer sides of which the corresponding shafts 14, 15 abut and in which cups is located a ball 16 by virtue of which latter there is formed between the coupling members a universal joint connection which facilitates adjustment of the coupling members with relation to each other for the accommodation of the respective shafts that are coupled by my improved coupling and insuring their proper support irrespective of whether they be in true alinement or at an angle one to the other. The shafts 14, 15 are keyed to the hubs of the coupling members in any suitable manner, the set screws 17 being one way in which the shafts may be fastened to the coupling members.

What I claim is:—

1. A flexible shaft coupling comprising coupling members, each member including a hub and radial fingers, the fingers of one member being arranged out of alinement with the fingers of the other member, flexible elements connecting the fingers of the members, and driving connections on the flexible elements engaging the adjacent fingers of opposite members.

2. A flexible shaft coupling comprising coupling members, each member including a hub and radial fingers, flexible elements connecting the fingers of the members, and combined spacing and driving connections loosely mounted on the flexible elements between adjacent fingers of the companion members.

3. A flexible shaft coupling comprising coupling members, each having radial fingers, the fingers of one member being arranged between the fingers of the companion member, flexible elements connecting the fingers of the members, combined spacing and driving connections loosely mounted on the flexible elements between adjacent fingers of companion members, and a universal joint connection between the members.

In testimony whereof I affix my signature in presence of two witnesses.

BENJAMIN F. AUGUSTINE.

Witnesses:
JOHN H. SIGGERS,
GEO. C. SHOEMAKER.